May 24, 1938. G. R. WÖLFLE 2,118,387
DRILLING SPINDLE DRIVE FOR VERTICAL DRILLING MACHINES
Filed Jan. 4, 1937
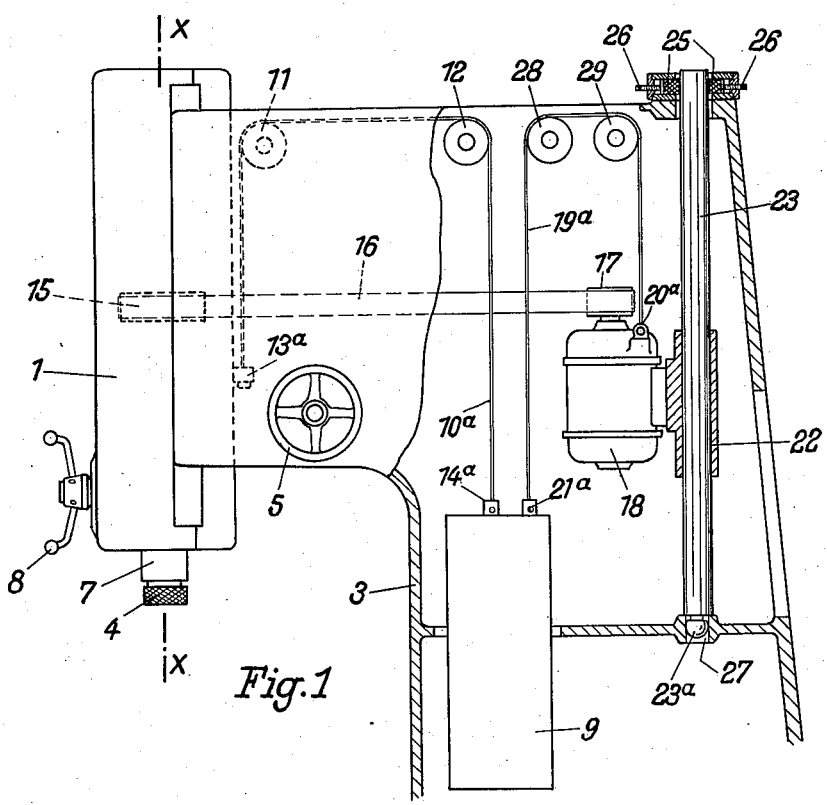
Fig.1
Fig.2
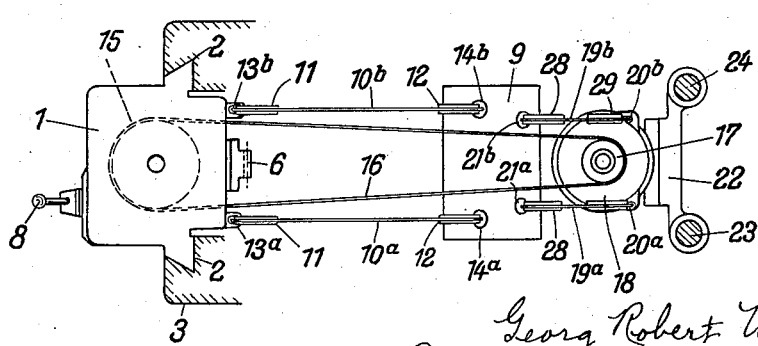
Inventor:
Georg Robert Wölfle,
By Frank S. Appleman,
attorney Patented May 24, 1938

2,118,387

UNITED STATES PATENT OFFICE 2,118,387

DRILLING SPINDLE DRIVE FOR VERTICAL DRILLING MACHINES

Georg Robert Wölfle, Berlin-Pankow, Germany, assignor to Herbert Lindner, Berlin-Wittenau, Germany Application January 4, 1937, Serial No. 119,047
In Germany July 27, 1936

6 Claims. (Cl. 77—36)

This invention relates to a drilling spindle drive for vertical drilling machines of the type having a drill head adjustable in the direction of the axis of the drilling spindle, and in which a belt pulley partakes in the motion of and is fixed on the drilling spindle, a counterweight being provided for the drill head which enables an easy adjustment thereof.

In known vertical drilling machines, in which the belt pulley of the drilling spindle follows the shifting motion of the drill head, a belt pulley drive is provided for transmitting the rotation, which is splined on a shaft provided with spline grooves and is shifted relative to the shaft in accordance with the drill head motion longitudinally. The shaft is arranged in bearings in or on the drill head and is driven by a motor provided on the machine frame. Its length approximately corresponds to the height of the drill head. Now for certain drilling purposes, and for fine drilling, comparatively high operating speeds are required. Consequently, the shaft must run with a correspondingly high number of revolutions. Owing to its length, however, oscillations occur which are transmitted to the drill head and impair the drilling.

The present invention tends to improve these conditions by avoiding the use of fast running, long shafts. According to the invention, the drive motor is shiftable vertically of the machine support and connected to the counterweight for the drill head to follow its shifting motions. Thus, a condition is achieved, with a maximum of ease and without the need of additional gear parts, in which the motor belt pulley is permanently in the same plane with the belt pulley on the drilling spindle.

The drive motor may be arranged directly on or in the machine frame. However, it is preferable to arrange it on a rod or on one of the rods provided in the machine frame parallel to the drill head guides. Such structure of the motor guide is simple and inexpensive. In order to secure the machine from oscillations, it is advisable to arrange the guide rod for the motor on oscillation-damping buffers carried by the machine frame.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a vertical drilling machine in elevation, the frame being partly in section; and Figure 2 illustrates a schematic plan of the drive arrangement in such a machine.

In the vertical drilling machine, which is shown only in parts, the drill head 1 is vertically shiftable in the usual manner in the guides 2 of the machine frame 3, the movement being longitudinally of the axis $x$—$x$ of the drill spindle 4. The shifting is controlled by the hand wheel 5 which coacts with a rack 6 fixed to the back side of drill head through a gear which is not shown.

In the embodiment shown, the shiftable arrangement of the drill head is used only for vertical adjustment, while the feed motion of the drill spindle 4 is effected by shifting the drill spindle 7, which may be done automatically or by hand by means of a handle wheel 8, in the usual manner. Naturally, the drill head 1 might, by its weight, effect the feed motion. In order to achieve an easy shifting of the drill head 1, it is balanced by a counterweight 9 to which it is connected by chains or cables 10a and 10b. The chains are guided from the drill head 1 to the counterweight 9, preferably located within the hollow frame 3 by transmission rolls 11 and 12. Their connection with the drill head is effected at 13a and 13b, and to the weight 9 at 14a and 14b in any appropriate manner. The drill spindle is rotated by a belt pulley 15 fixed thereon, said pulley being driven by means of a belt 16 connecting pulley 15 to the belt pulley 17 of an electro-motor 18. In the vertical adjustment of the drill head, the belt pulley 15 follows the shifting motion. In order to have the motor belt-pulley 17 permanently on the same plane with it, the motor 18 is connected with the counterweight 9 by means of chains or cables 19 and 19a. The counterweight corresponds in its weight to the combined weights of the drill head and the motor. The chains 19a, 19b are connected with the upper portion of the motor at 20a and 20b, and with weight 9 at 21a and 21b. These chains run over idlers 28 and 29. The motor 18 is mounted on a support 22, which is in turn slidably mounted on two rods 23 and 24 which may be of any desired length. The rods 23 and 24 are mounted parallel to the drill head guides in the frame 3, and the said rods are in such spaced relation to the drill head that vibration of the motor which is guided by the rods is absorbed before such vibrations can affect the position of the said head or cause vibrations in said head.

Hence, this device achieves in the easiest possible manner a condition where the drive motor 18 follows the shifting motion of the drill head 1. The guide rods 23 and 24 are arranged in oscillation damping bearings in the support 3. In the form illustrated, their upper ends are arranged in elastic buffers 25, said buffers being adjustable by means of set screws 26. The buffers prevent the transmission of oscillations of the motor to the machine frame. The damping of the oscillations may also be effected in such manner that the motor is arranged directly on an elastic sleeve provided in the support 22. However, an elastic bearing of the guide rod appears to be preferable in view of the easy access to the bearing parts. On their lower ends, each of the guides 23 and 24 has a ball head, one of these heads being shown at 23a. Each head is mounted in a bore 27 formed in the frame 3. This provides an easy adjustment of the guides. The motor 18 may also be arranged merely along one rod, and its suspension may be effected like that of a bascule, so that it tends to stretch the belt, owing to its own weight. Finally, the motor 18 may also be arranged directly in the guides of the support 3. However, in view of the inexpensiveness of this construction, the use of the guide rods shown in Figures 1 and 2 appears to be the most convenient method.

I claim:

1. In a vertical drilling machine, a frame, a drill head slidable vertically of said frame, a drill spindle journalled in said head to move therewith, a belt pulley splined on said spindle, guide means mounted in said frame parallel to the axis of the spindle, a motor slidably mounted on said guide means and having a driving pulley, said guide means being spaced from said spindle to prevent the transmission thereto of vibrations from said motor, a horizontal belt connecting said pulleys, and means to counterweight the head and motor and separate means connecting each of said motor and said head to said counterweight to connect the head and motor for simultaneous vertical movements in the same direction.

2. In a vertical drilling machine, a frame, a drill head slidable vertically of said frame, a drill spindle journalled in said head to move therewith, a belt pulley splined on said spindle, guide means mounted in said frame parallel to the axis of the spindle, a motor slidably mounted on said guide means and having a driving pulley, said guide means being spaced from said spindle to prevent the transmission thereto of vibrations from said motor, a horizontal belt connecting said pulleys, means to counterweight the head and motor and separate means connecting each of said motor and said head to said counterweight to connect the head and motor for simultaneous vertical movements in the same direction, and oscillation damping means interposed between the motor and said frame.

3. In a vertical drilling machine, a frame, a drill head slidable vertically of said frame, a drill spindle journalled in said head to move therewith, a belt pulley splined on said spindle, a vertical rod mounted in said frame parallel to the axis of the spindle, a motor slidably mounted on said vertical rod and having a driving pulley, said rod being spaced from said spindle to prevent the transmission thereto of vibrations from said motor, a horizontal belt connecting said pulleys, and means to counterweight the head and motor and separate means connecting each of said motor and said head to said counterweight to connect the head and motor for simultaneous vertical movements in the same direction.

4. In a vertical drilling machine, a frame, a drill head slidable vertically of said frame, a drill spindle journalled in said head to move therewith, a belt pulley splined on said spindle, a vertical rod mounted in said frame parallel to the axis of the spindle and separated therefrom, a motor slidably mounted on said vertical rod and having a driving pulley, a horizontal belt connecting said pulleys, means to counterweight the head and motor and to connect the head and motor for simultaneous vertical movements in the same direction, and oscillation damping means interposed between one end of the vertical rod and said frame, the other end of the rod being rockingly supported in the frame.

5. In a vertical drilling machine, a frame, a drill head slidable vertically of said frame, a drill spindle journalled in said head to move therewith, a belt pulley splined on said spindle, a vertical rod mounted in said frame parallel to the axis of the spindle and separated therefrom, a motor slidably mounted on said vertical rod and having a driving pulley, a horizontal belt connecting said pulleys, means to counterweight the head and motor and to connect the head and motor for simultaneous vertical movements in the same direction, oscillation damping means interposed between one end of the vertical rod and said frame, the other end of the rod being rockingly supported in the frame, and means to adjust said damping means relative to the axis of the drill spindle.

6. In a vertical drilling machine, a frame, a drill head slidable vertically of said frame, a drill spindle journalled in said head to move therewith, a belt pulley splined on said spindle, a vertical rod mounted in said frame parallel to the axis of the spindle and separated therefrom, a motor slidably mounted on said vertical rod and having a driving pulley, a horizontal belt connecting said pulleys, a counterweight, flexible devices connected to the counterweight and to the head and motor respectively, for simultaneously moving them in the same direction and substantially the same degree, an oscillation damping means interposed between one end of the vertical rod and said frame, and means on the frame for rockingly supporting the opposite end of the rod.

GEORG ROBERT WÖLFLE.